United States Patent
LeRow et al.

(10) Patent No.: US 7,138,728 B2
(45) Date of Patent: Nov. 21, 2006

(54) ANTI-ISLANDING TECHNIQUES FOR DISTRIBUTED POWER GENERATION

(75) Inventors: Kevin E LeRow, Lowell, MA (US); Richard S Welches, Amherst, NH (US)

(73) Assignee: Youtility, Inc., Hudson, NH (US)

( * ) Notice: Subject to any disclaimer, the term of this patent is extended or adjusted under 35 U.S.C. 154(b) by 523 days.

(21) Appl. No.: 10/280,739

(22) Filed: Oct. 25, 2002

(65) Prior Publication Data
US 2003/0080741 A1    May 1, 2003

Related U.S. Application Data

(60) Provisional application No. 60/337,351, filed on Oct. 26, 2001.

(51) Int. Cl.
*H02J 1/00* (2006.01)

(52) U.S. Cl. ........................................................ 307/30

(58) Field of Classification Search .................. 702/60; 307/30, 45, 32; 324/527, 533
See application file for complete search history.

(56) References Cited

U.S. PATENT DOCUMENTS

| | | | |
|---|---|---|---|
| 4,694,188 A | 9/1987 | Diegel et al. | |
| 4,788,619 A | 11/1988 | Ott et al. | |
| 5,369,353 A | 11/1994 | Erdman | |
| 5,493,485 A | 2/1996 | Okado | |
| 5,686,766 A * | 11/1997 | Tamechika | 307/43 |
| 5,808,449 A | 9/1998 | Hirayama et al. | |
| 6,118,187 A | 9/2000 | Hepner et al. | |
| 6,172,889 B1 * | 1/2001 | Eguchi et al. | 363/95 |
| 6,219,623 B1 * | 4/2001 | Wills | 702/60 |
| 6,239,997 B1 | 5/2001 | Deng | |
| 6,282,104 B1 | 8/2001 | Kern | |
| 6,288,456 B1 | 9/2001 | Cratty | |

FOREIGN PATENT DOCUMENTS

WO    WO01/11763 A1    2/2001

OTHER PUBLICATIONS

H. Haeberlin, J. Graf, and Ch. Beutler. "Islanding of Grid-connected PV Inverters: Test Circuits and Test Results," IEA-PVPS Task V: Workshop about Grid Interconnection of Photovoltaic Power Systems, Sep. 15-16, 1997, pp. 1-9.*

P. O'kane and B. Fox. "Loss of Mains Detection for Embedded Generation by System Impedance Monitoring," Developments in Power System Protection Mar. 25-27, 1997, pp. 95-98.*

PCT International Search Report dated Sep. 30, 2003 of International Application No. PCT/US02/34250 filed Oct. 25, 2002.

Dawson, Doug et al., Utility Interconnection Protection Requirements for Dispersed Photovoltaic Systems, Quarterly Highlights of Sandia's Photovoltaics Program Jan./Mar. 1997, pp. 1-12.

(Continued)

*Primary Examiner*—Robert L. Deberadinis
(74) *Attorney, Agent, or Firm*—Maine & Asmus

(57) ABSTRACT

Techniques for detecting an island in a system including a node that is operatively coupled to a primary power source (e.g., grid) and one or more distributed power generation sources are disclosed. In one embodiment, a current pulse is included in the output of a distributed power source. The grid voltage is monitored at the node to determine if a pulse-related disturbance occurs. If the grid is present, no pulse-related disturbance will manifest. If grid is down, then a pulse-related disturbance will manifest. Detection of the pulse-related disturbance is used to signal island detection.

41 Claims, 8 Drawing Sheets

OTHER PUBLICATIONS

Stevens, John, The Interconnection Issues of Utility-Intertied Photovoltaic Systems, Sandia Labs., SAND87-3146, Jun. 1997 pp. 3-29.

Wills, Robert H., The Interconnection of Photovoltaic Power Systems with the Utility Grid: An Overview for Utility Engineers, Sandia Labs., SAND94-1057, Jun. 1994 pp. 5-40.

Starrs, Thomas et al., Barriers and Solutions for Connecting PV to the Grid, Presented at the annual conference of the American Solar Energy Society Jun. 1998, Albuquerque, NM 6 pages.

Stevens, John et al., Development and Testing of an Approach to Anti-Islanding in Utility-Interconnected Photovoltaic Systems, Photovoltaic System Applications Department, Sandia Nat'l Labs., Albuquerque, NM 18785-0753, Aug. 2000, pages cover-58.

Kern, G.A., et al., Results of Sandia National Laboratories Grid-Tied Inverter Testing, presented at 2nd World Conference and Exhibition on Photovoltaic Solar Energy Conversion, Jul. 6-10, 1998, Vienna, Austria.

* cited by examiner

ANTI-ISLANDING TECHNIQUES FOR DISTRIBUTED POWER GENERATION

RELATED APPLICATIONS

This application claims the benefit of U.S. Provisional Application No. 60/337,351, filed Oct. 26, 2001, which is herein incorporated in its entirety by reference.

FIELD OF THE INVENTION

The invention relates to power distribution, and more particularly, to the detection of island conditions in a multiple source power system.

BACKGROUND OF THE INVENTION

Existing conventional centralized power systems generally include a single utility that supplies power to a grid, where users (commercial and residential power consumers) are connected to the grid. Electrical service can thus be provided by the utility to the consumers. Such centralized systems are beneficial in that they do not require a comprehensive power management scheme. This is because there is only one utility providing power.

However, power shortages and deregulation of electric companies in the United States has given rise to increased demand for independent energy sources that can co-exist with the electric utility, and supplement its capacity. Independent energy sources include, for instance, photovoltaics, wind, hydro, fuel cells, storage systems (e.g., batteries), superconductors, flywheels, capacitors, diesel engines, Stirling engines, gas turbines, and micro-turbines.

Given the availability of such independent energy sources, a typical goal in energy production is to interconnect any number of independent energy sources together with the central utility power source on a single power grid, or to develop smaller local area grids with multiple independent energy sources. In such a decentralized, distributed power generation system, each of the independent energy sources draws power from the grid when needed, and delivers power to the grid when an excess exists. This arrangement effectively supplements the capacity of the central utility, and enables the independent sources to buy and sell their energy.

However, unlike a centralized system, a decentralized local grid power system requires interconnection of the multiple energy sources and a comprehensive management scheme. For example, the proper grid voltage must be maintained with multiple power sources connected to the grid. In addition, large scale integration of independent power sources requires an interface between the grid and the power sources to regulate the power from/to the grid, and to monitor and regulate the activity. Each independent source's power must be converted to have parameters (e.g., phase and magnitude) that accommodates the grid parameters.

In addition to power conversion requirements, there is also a requirement that each independent source must be adapted to disconnect from the grid when the grid becomes unstable in order to avoid islanding. Islanding, also referred to as run-on, is the continued operation of a grid-coupled power converter, generator, or independent power source when the utility grid has been switched off, cut-off, or the distribution lines have been damaged.

Under such conditions, no power is delivered from the utility side and all independent sources should be disconnected from the grid. Such disconnects are intended to prevent the power of an independent source from feeding back through the grid to other power lines. The independent source can still supply power to its load if necessary. Without such disconnects, unsafe conditions may result, such as hot power line that is supposed to be de-energized for repairs.

Power quality is also a concern, as the voltage, frequency, harmonic content, and other parameters of the grid might go outside acceptable bounds. This condition presents a hazard to loads on the grid, such as computers and other sensitive electronics that might be damaged by an unstable or otherwise non-conforming grid. Moreover, the distributed generating equipment connected to the grid can be damaged due to grid parameter fluctuations, which may further present a safety hazard to the property and persons nearby such equipment.

Conventional schemes that have been proposed or implemented to eliminate the islanding problem, however, have only achieved marginal success and are generally considered unreliable. In particular, each of the available techniques are associated with non-detect zones, where islanding may still occur given a particular set of conditions. Thus, even though such schemes may work some percentage of the time, the associated risks to life and property remain substantial.

Many of the potential grid faults that could interrupt the flow of power from utility power stations to consumers could be repaired safely without affecting consumers if there was a reliable anti-islanding technique. It would allow the local reticulation lines, or any grid connected inverters connected to them, to be powered down safely with no risk of electrical shock.

What is needed, therefore, is an anti-islanding technique that reliably eliminates islanding conditions in all likely distributed generation situations.

BRIEF SUMMARY OF THE INVENTION

One embodiment of the present invention provides an anti-islanding system for distributed power on a grid. The system includes a distributed power source operatively coupled to a grid. The distributed power source is adapted with output current control. The system further includes a voltage sensor connected to a node between the distributed power source and the grid. The sensor is adapted to monitor grid voltage. The system further includes an anti-islanding protection controller that is operatively coupled to the distributed power source and the voltage sensor. The anti-islanding protection controller is adapted to request the distributed power source to selectively output a current pulse in the power being provided so as to cause a voltage deflection in the grid voltage if an island condition exists. The controller is further adapted to detect an island condition based on voltage deflection data provided by the voltage sensor.

Another embodiment of the present invention provides a method for detecting an island in a system including a node that is operatively coupled to a grid and one or more distributed power generation sources. The method includes selectively applying a current pulse from at least one of the distributed power generation sources onto the node, and monitoring the node for a disturbance related to the applied current pulse. In response to detecting a disturbance, the method further includes signaling an island detection.

Another embodiment of the present invention provides an apparatus for detecting an island in a system including a node that is operatively coupled to a grid and one or more distributed power generation sources. The apparatus includes a pulse request module adapted to generate a pulse request that causes a distributed power generation source to include a current pulse in its output signal so that a pulse-related disturbance will manifest on the node if an island is present. The apparatus further includes an island detection module adapted to generate an island detect signal in response to a pulse-related disturbance being detected on the node.

Another embodiment of the present invention provides an apparatus for detecting an island in a system including a node that is operatively coupled to a primary power source and one or more distributed power generation sources. The apparatus includes a disturbance request module adapted to cause a distributed power generation source to modify its output so that a disturbance-related to the modified output will manifest on the node if an island is present. The apparatus further includes an island detection module adapted to generate an island detect signal in response to a disturbance-related to the modified output being detected on the node.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1A:
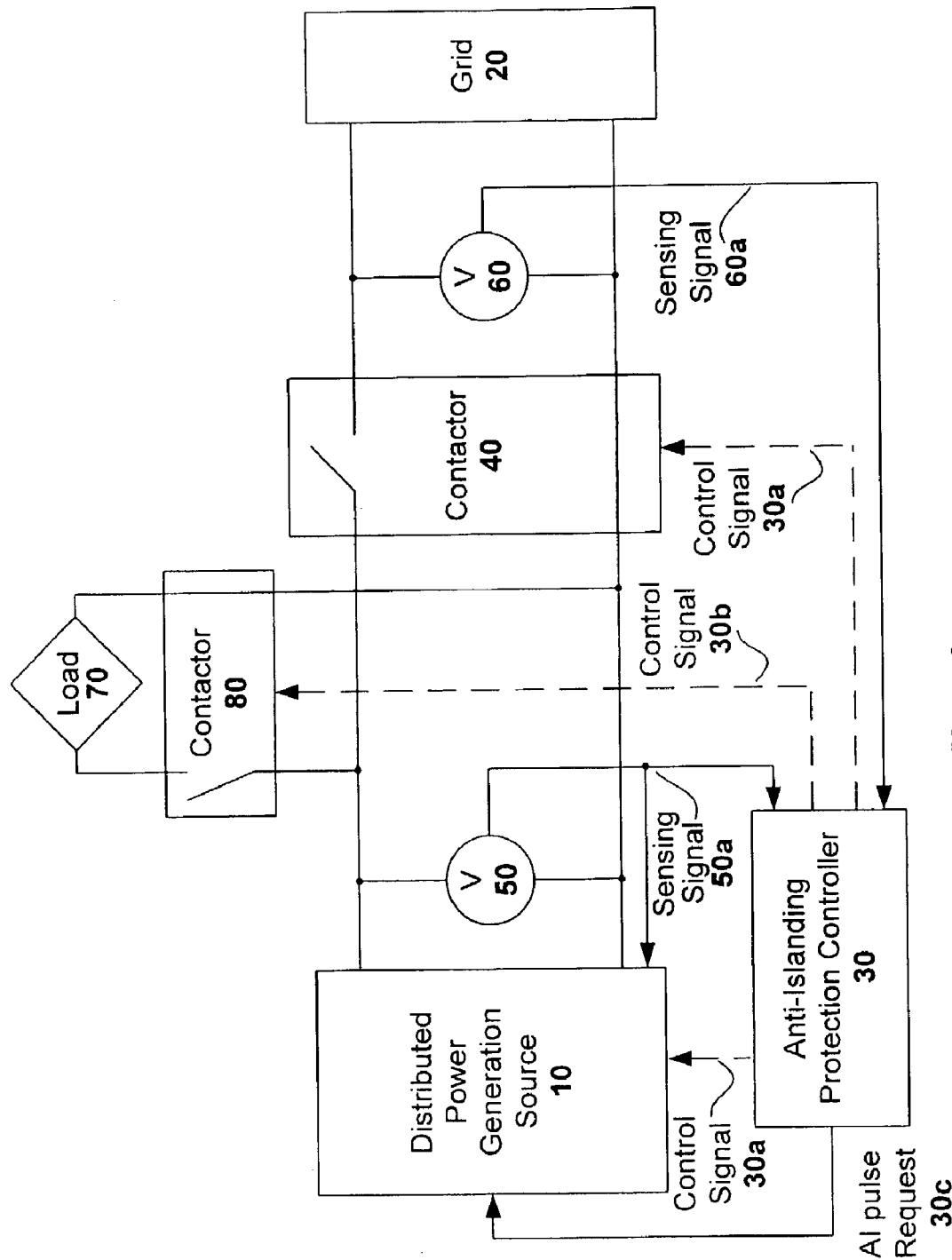
FIG. 1a is top-level block diagram of a distributed power system configured in accordance with one embodiment of the present invention.

A grid is typically a combination of loads, utility sources, and distributed power sources that are interconnectable at any point and time via transmission lines. Proposed industry specifications such as the IEEE P1547, IEEE P929, and UL 1741 require that any grid-connected distributed power source must be able to detect an island condition. Evidence of an existing island condition is indicated when the impedance of grid-separated loads match the impedance of local distributed sources such that the voltage and frequency on the island matches emulates that of the disconnected grid. An island is self-supporting, and power is present in that leg of the grid, even when the utility believes that leg has been de-energized.

Embodiments of the present invention provide a mechanism for reliably detecting the presence of an island situation, even with other distributed power sources connected to the island.

General Overview

An underlying principle of the present invention involves intentionally creating a distortion around at a known point (e.g., zero-crossing) of a distributed source's waveform. The resulting response can then be monitored, measured, or otherwise interrogated. In particular, characteristics related to the distortion injected into the waveform indicate whether an island condition is present or not. The characteristics might be, for example, a voltage deflection in the output waveform, or a change in the line's conductance measurement based on the slope of the waveform.

As applying distortion to every cycle of power source waveform typically has an adverse impact on total harmonic distortion (THD), periodic application of the distortion is enabled. Periodically applying the distortion in a selective pattern allows for full protection against islanding, and keeps the THD low. A periodic or "patterned" approach is particularly useful when multiple distributed power sources are all tied to the same grid. The cumulative effect of simultaneously applying a distortion to multiple distributed power sources in accordance with a pattern increases the resulting indication as to the grid status and islanding conditions.

Note that the pattern defining the periodic application of the distortion can be predetermined or random. In addition, the pattern can be tailored based on the specific application. For example, various events occurring in the system can be used to modify or otherwise define the distortion application pattern. In one such embodiment, the pattern is programmed to respond to parameter levels. For instance, if there is a voltage reading out of limits, the distortion can be applied at a decreased interval so that system conditions can be more closely monitored. Alternatively, a keying scheme can be employed where the key is synchronized with the application of distortion.

One embodiment of the present invention periodically injects a current spike, or anti-islanding (AI) pulse, at the zero-crossing of a distributed power source's waveform. The AI pulse causes a distortion in the form of a voltage deflection when an island exists, and not the entire grid. This is primarily due to the impedance differences between a grid and an island. A grid's impedance is relatively low (e.g., conductance nears infinity) compared to the impedance of an island. An applied AI pulse will generally be absorbed into the grid and no voltage deflection will occur. However, when the AI pulse is applied to an island, a detectable manifestation of the pulse is produced, whether that manifestation be a voltage deflection or other characteristic (e.g., unusually low conductance measurement).

By periodically applying the AI pulse at zero-crossings, other distributed sources are, at that instant, not supplying any real power to the island. This is because those other sources are also at their respective zero-crossing points based on grid synchronization. As such, the result of applying a single AI pulse to the island or grid is readily manifested and therefore reliably detectable undisturbed by other distributed sources. In addition, if other systems coupled to the grid employ an AI pulse scheme, the pulse patterns of those systems can be configured to pulse together at some point in time thereby causing an even greater voltage deflection. This beneficial stacking effect is in contrast to conventional anti-islanding schemes, where different detecting sources tend to interfere with or cancel the effect of other detecting sources.

Further detection sensitivity can be achieved by observing the harmonic patterns associated with the waveforms of the distributed sources' outputs. Such patterns indicate a variety of possible line fault conditions, such as a ground fault of the utility grid. Observation of harmonic patterns may therefore be used to trigger a high PRF AI detect mode, where the interval at which AI pulses are applied to the suspect distributed source is increased. In some cases, the suspect source may be shut-down or otherwise disabled if appropriate. Note that any power source that is connectable to an electrical grid can be monitored for an islanding condition.

For purposes of facilitating understanding, the system architectures of various embodiments are provided followed by a discussion on system functionality. Note that embodiments of the present invention can be implemented in hardware, software, firmware or any combination thereof.

System Architecture

FIG. 1a is top-level block diagram of a distributed power system configured in accordance with one embodiment of the present invention. The system includes a distributed power generation source 10, an anti-islanding protection controller 30, contactors 40 and 80, and voltage sensors 50 and 60. As can be seen, the system is operatively coupled to grid 20, and provides power to a local load 70.

The distributed power generation source 10 is capable of output current control, and is connectable to the grid 20 via the contactor 40. The anti-islanding protection controller 30 is adapted to detect islanding conditions, and to disconnect the power source 10 from grid 20 by opening the contactor 40. As will be appreciated, the grid 20 generally encompasses one or more utility sources, various loads, and other distributed power generation sources that are linked by transmission lines.

The voltage sensor 50 monitors the voltage of the power source 10, and ensures that the output of source 10 is within its intended window of operation. This is the case whether the source 10 is connected or disconnected from the grid 20. In a similar fashion, the second voltage sensor 60 monitors the voltage levels of grid 20, whether the source 10 is connected or disconnected from the grid 20. The voltage sensors 50 and 60 can also be adapted to monitor other conditions, such as induced voltage deflections, and can be implemented with conventional sensing technology.

In this particular embodiment, the sensing signal 50a produced by sensor 50 is provided to both the anti-islanding protection controller 30 and the source 10. The sensing signal 60a is provided to the anti-islanding protection controller 30. The anti-islanding protection controller 30 is programmed or otherwise configured to interpret the sensor signals 50a and 60a. If an out-of-spec condition exists (whether from the source 10 or the grid 20), the anti-islanding protection controller 30 outputs a control signal 30a that causes the contactor 40 to open thereby isolating the source 10 from grid 20. Note that control signal 30a is also provided to the source 10, thereby informing source 10 to switch from current source mode to voltage source mode so that load 70 can continue to be serviced. Further note that the source 10 must be made in sync with grid 20 with respect to phase, frequency, and voltage (e.g., using conventional sync techniques) before the anti-islanding protection controller 30 is allowed to reset the control signal 30a for re-closing contactor 40.

Allowing power source 10 to continue providing service to the local load 70 even when the source 10 is disconnected from the grid 20 may be particularly desirable when load 70 is a critical load requiring UPS protection. In such a case, source 10 can be adapted to change from a current source to a voltage source when the grid 20 is disconnected in response to control signal 30a. Other loads 70 (not shown) may be connected both locally and after the contactor 40. Non-critical loads connected after the contactor are not UPS protected, but may be involved in an island condition with critical loads 70 on the other side of the contactor 40.

The power source 10 can be reconnected to the grid 20 when the grid 20 is stabilized (as indicated by sensor 60). In addition, the load 70 can be disconnected from source 10 (as well as grid 20) via contactor 80 in response to control signal 30b. The anti-islanding protection controller 30 might set control signal 30b, for example, to open contactor 80 during a diagnostic test or because of a sensed non-conforming condition. In addition, an anti-islanding (AI) pulse request 30c allows controller 30 to communicate with the power source 10 in generating AI pulses as will be further explained in forthcoming discussion.

The system can therefore disconnect or connect the power source 10 from the grid 20 based on the output of sensors 50 and or 60. The system can also optionally disconnect or connect the load 70 from the source 10 or grid 20 independent of the connection between source 10 and grid 20.

In an alternative embodiment, the power source 10 is configured with a disable function that can be activated based on the control signal 30a when an island is detected. In such a case, the source 10 could be shut-down and placed in a high-impedance state thereby eliminating the need for contactor 40. In addition, only one voltage sensor would be needed to sense the voltage at the common node between the source 10 and the grid 20. Thus, voltage sensor 60 could be eliminated, and all sensing could be performed by voltage sensor 50. In such an embodiment, rather than disconnecting and re-connecting, the power sources 10 can be disabled or enabled based on the output of the AI protection controller 30.

Other variations may have more or less components. For instance, contactor 80 and its related control line may be excluded in other embodiments. In addition, functionality of one module may be integrated into another module, such as sensor 50 being included in power source 10. Likewise, the functionality of the AI protection controller 30 can be integrated into the power source 10.

Figure 1B:
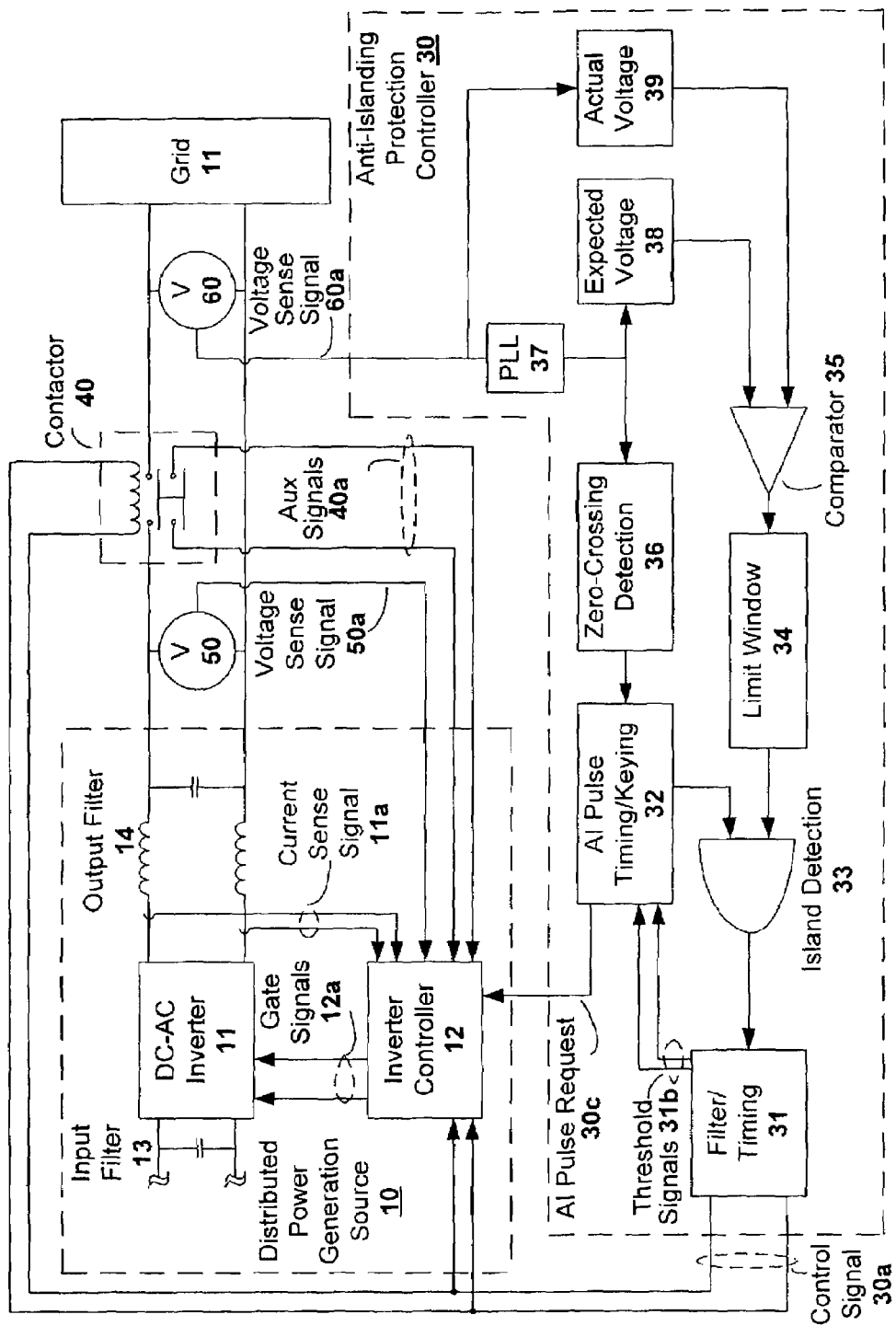
FIGS. 1b and 1c are each low-level block diagrams of a distributed power system configured in accordance with embodiments of the present invention.

FIG. 1b is a detailed block diagram of a distributed power system configured in accordance with one embodiment of the present invention. As can be seen, the system includes a distributed power generation source 10 that is connected to grid 20 via contactor 40. Voltage sensors 50 and 60 are adapted to monitor the respective outputs of the source 10 and grid 20. An anti-islanding protection controller 30 outputs AI pulse requests to the source 10 and actuates contactor 40 based on voltage sense signal 60a. One or more critical/non-critical loads (not shown) may be connected, for instance, as previously discussed.

In this embodiment, the distributed power generation source 10 includes a DC-AC inverter 11, an inverter controller 12, an input filter 13, and an output filter 14. Note that other inverter types (e.g., AC—AC) may be employed as inverter 11. A local power source (not shown), such as a field of wind powered DC generators, can be connected to the inverter 11 via the input filter 13. Input filter 13 conditions the DC input signal for processing by the inverter 11, while output filter 14 conditions the AC output signal of inverter 11 for application to grid 20.

In this example embodiment, inverter 11 is adapted to pulse width modulate DC signals provided at its input and otherwise produce an output for application to the grid 20. Gate signals 12a are produced by inverter controller 12 and applied to the inverter 11 thereby enabling a conventional pulse width modulation process, and control over the current output by the inverter. A current sense signal 11a is fed back to the inverter controller 12, and allows the output of the inverter 11 to be sensed (e.g., using a conventional current sensing technology included in inverter controller 12).

The voltage sensor 50 measures the output voltage of inverter 11 on the local side of contactor 40. In this embodiment, the voltage sense signal 50a is communicated back to the inverter controller 11. Thus, the inverter controller 12 is always aware of the voltage output by the inverter 11, and can effect necessary adjustments to that output via gate signals 12a.

The anti-islanding protection controller 30 includes a filter and timing module 31, an AI pulse timing and keying module 32, an island detection module 33, a limit window module 34, a comparator module 35, a zero-crossing detection module 36, a phase lock loop (PLL) module 37, an expected voltage module 38, and an actual voltage module 39. The voltage of grid 20 is sensed by sensor 60, and is manifested as voltage sense signal 60a. This sense signal 60a is provided to the PLL module 37. The anti-islanding protection controller 30 interrogates the sensed voltage signal 60a and generates control signal 30a and AI pulse request 30c as needed.

Contactor 40 is configured to disconnect/connect the inverter 11 output from grid 20 in response to control signal 30a. Contactor 40 is particularly useful, for example, in isolating the grid 20 from a load (not shown) being serviced by inverter 11 when there is an islanding condition or other fault on the grid 20. Contactor auxiliary signals 40a are optionally provided to the inverter controller 12 thereby enabling a determination as to whether the contactor 40 is open or closed. Note that contactor 40 can be implemented in a number a switching technologies, such as a circuit breaker that is equipped with an auxiliary trip coil and a reclosing mechanism, or simply a controllable open and close switch.

Generally, employing voltage sensors before and after contactor 40 allows the system to monitor the grid 20 voltage and the local source 10 voltage, even with the contactor 40 disconnected. Thus, the local source can re-connect to the grid in response to detecting grid voltage is re-established (e.g., as indicated by sensor 60).

The voltage sense signal 60a from voltage sensor 60 is provided to the actual voltage module 39, which conditions (e.g., amplifies or attenuates) the voltage sense signal 60a as necessary and outputs an actual grid voltage. The voltage sense signal 60a is also input to the PLL module 37, which computes an expected grid voltage. This result is provided to the expected voltage module 38, which conditions (e.g., amplifies or attenuates) the result of the PLL module 37 as necessary and outputs the expected grid voltage. Note that the expected grid voltage does not include any pulse-related distortion qualities, such as a voltage deflection.

The PLL module 37 result is also processed to determine the zero-crossing in accordance with zero-crossing detection module 36. Conventional phase lock loop and zero-crossing detection techniques can be employed here.

Comparator module 35 receives the expected grid voltage and the actual grid voltage outputs from the respective modules 38 and 39, and is adapted to compare the actual grid voltage to the expected grid voltage and to generate a difference signal. The difference signal is applied to the limit window module 34, which generates a false result (e.g., logical 0) if within acceptable limits (indicative of no island condition) and a true result (e.g., logical 1) if there is an unacceptable voltage error (indicative of an island condition). These true/false island indication signals are provided to the island detection module 33.

The AI pulse timing/keying module 32 uses the zero-crossing information provided by the zero-crossing detection module 36 to determine the frequency of the actual grid voltage, and the interval at which AI pulses are requested (e.g., 1 every 6 cycles) can then be determined. This interval can further be used to establish a window that marks the period of time from initial application of the AI pulse at the zero-crossing point to a predetermined subsequent point in time before application of the next AI pulse. The signal in this window can be monitored for distortion or other island indicating data. In this sense, the window is herein referred to as a distortion window.

The limit window module 34 results are output to the island detection module 33, which functions as a logic AND gate in this particular embodiment. The other input to the AND gate 33 is a sync signal output by the AI pulse timing/keying module 32 to indicate whether the actual grid voltage measurement was taken during the AI pulse. Note that the AI pulse timing/keying module 32 outputs both an AI pulse request 30c and a sync signal to the island detection module 33.

The sync signal output to the island detection module 33 is true (e.g., logical 1) if the AI pulse is active, and false (e.g., logical 0) if otherwise. A delay may be programmed between when the AI pulse request 30c is output and when the sync signal is output in order to ensure that the actual grid voltage is measured at the peak (or close to the peak) of the requested AI pulse.

Generally, the output from the detection module 33 is false (e.g., logical 0) if the grid is within limits and true (e.g., logical 1) if there is an island condition. In the embodiment illustrated, the sync pulse input from the AI pulse timing/keying module 32 and the output of the limit window module 34 must both be true for the output of the detection module 33 to be true.

The results from the AND gate 33 are communicated to a filter/timing module 31, which is adapted average island detection results over a fixed period of time so as to desensitize the system against false detections or other anomalies. In this sense, the filter/timing module 31 can be referred to as an island detect accumulator. Outputs of the filter/timing module 31 include. Outputs of the filter/timing module 31 include threshold signals 31b and control signal 30a. Threshold signals 31b are provided to the AI pulse timing/keying module 32, and control signal 30a is used to connect or disconnect the local source from the grid via contactor 40, and to allow inverter controller 12 and controller 11 to switch from current source mode to voltage source mode when the contactor 40 is disconnected.

In one embodiment, each occurrence of island detection is stored (e.g., in memory device accessible by controller 30). An initial island detect threshold might be set at, for example, 3 or more detects out of 9 AI pulses, while a full-on island detect threshold might be 3 or more detects out of 4 AI pulses. If the initial island detect threshold is met, the filter/timing module 31 can be further adapted to signal the AI pulse time/keying module 32 to increase the AI pulse request interval. This signaling can be accomplished using a threshold signal 31b. Other intermediate thresholds can be signaled with each threshold signal 31b provided. Such an increased AI pulsing interval will allow for confirmation of a suspected islanding condition. Once the condition is confirmed (e.g., based on the full-on island detect threshold), the filter/timing module 31 can set control signal 30a to open contactor 40.

Numerous other such flexible AI pulsing schemes will be apparent in light of this disclosure, where the degree of AI pulsing depends on the number of islands detects. In this sense, the AI current pulse is applied according to a predefined routine depending on the voltage deflection data. In addition, by establishing an AI detect threshold for both True detects and Non-true detects, the possibility of missing a detect within a given time limit, such as a 2 second limit, is reduced. Indeterminate measurements can thus be eliminated, and the number of detect windows can be increased with out increasing Non-true detects.

The inverter controller 12 processes the various inputs and issues the gate signals to the inverter 11 to pulse width modulate the DC input signals. When no AI pulse is requested, the inverter controller 12 and inverter 11 operate in accordance with a conventional pulse width modulation scheme. On the other hand, when an AI pulse is requested, the inverter controller 12 and inverters 11 operate to provide a current spike on the AC output of the inverter 11.

Generally, the AC output of inverter 11 is defined by a number of half cycles including the current half cycle and an upcoming half cycle. Each half cycle is associated with a positive or negative going direction. The applied AI pulse may be in either the positive or negative direction, and its amplitude should be sufficient to provide a detectable manifestation given an island condition. In one embodiment, the direction of the applied AI pulse opposes the direction of the upcoming half cycle, and the amplitude of the AI pulse is approximately 100% of the rated peak current associated with source 10.

Figure 1C:
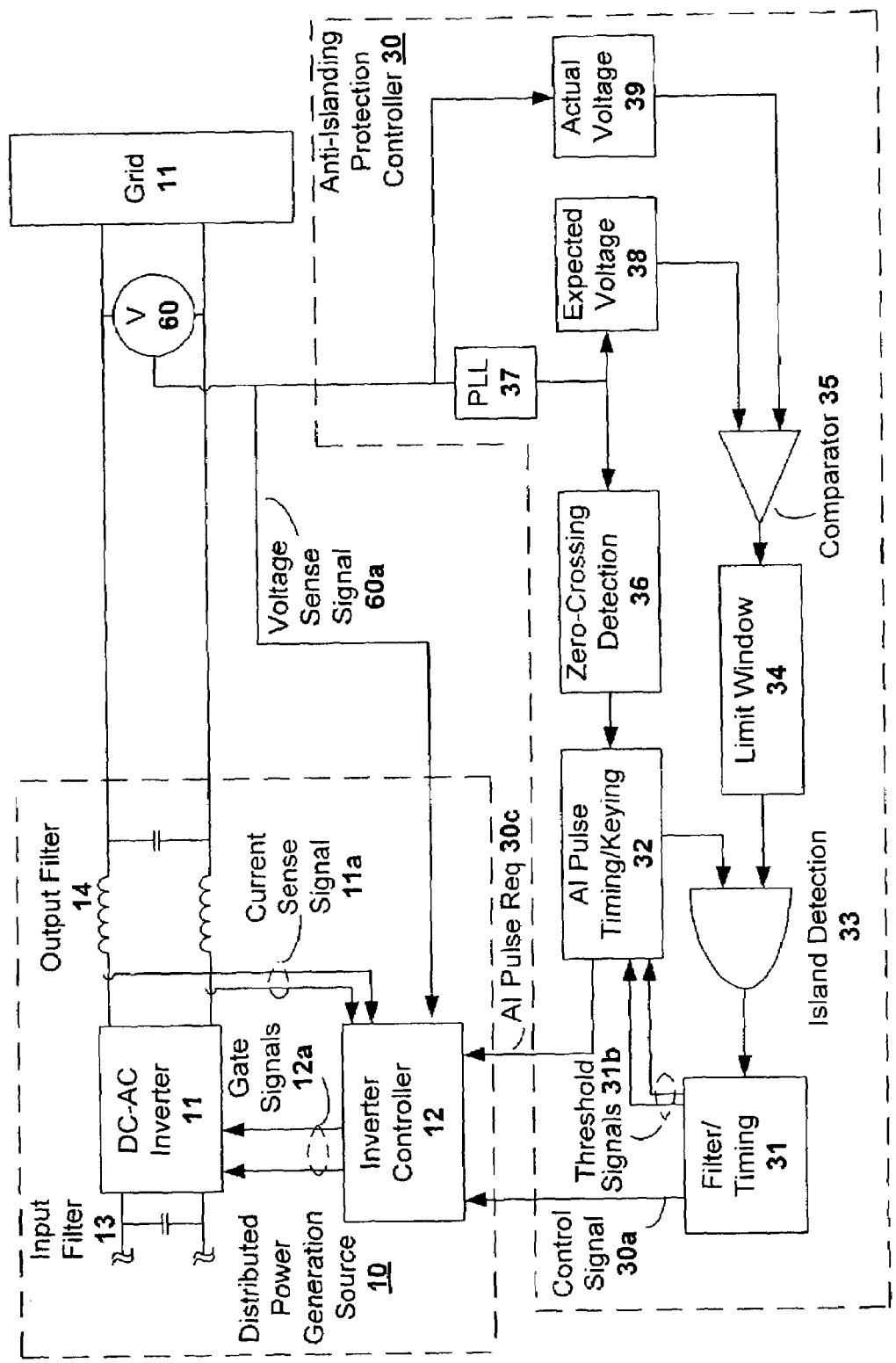

FIG. 1c is a low-level block diagram of a distributed power system configured in accordance with another embodiment of the present invention. This particular system does not include a contactor 40. In addition, there is only a single voltage sensor 60, as the inverter 11 is adapted to either operate in conjunction with the grid 20 or shut-down. The output of sensor 60 is provided to the inverter controller 12 so that the grid voltage is known. The control signal 30a output by the filter/timing module 31 is sent to the inverter controller 12, which continues producing power or shuts down based on the status of one or both of the control signals 30a and 60. As with the embodiment in FIG. 1b, the inverter controller 12 senses the current output by the inverter 11 thereby enabling output current control.

Figure 1D:
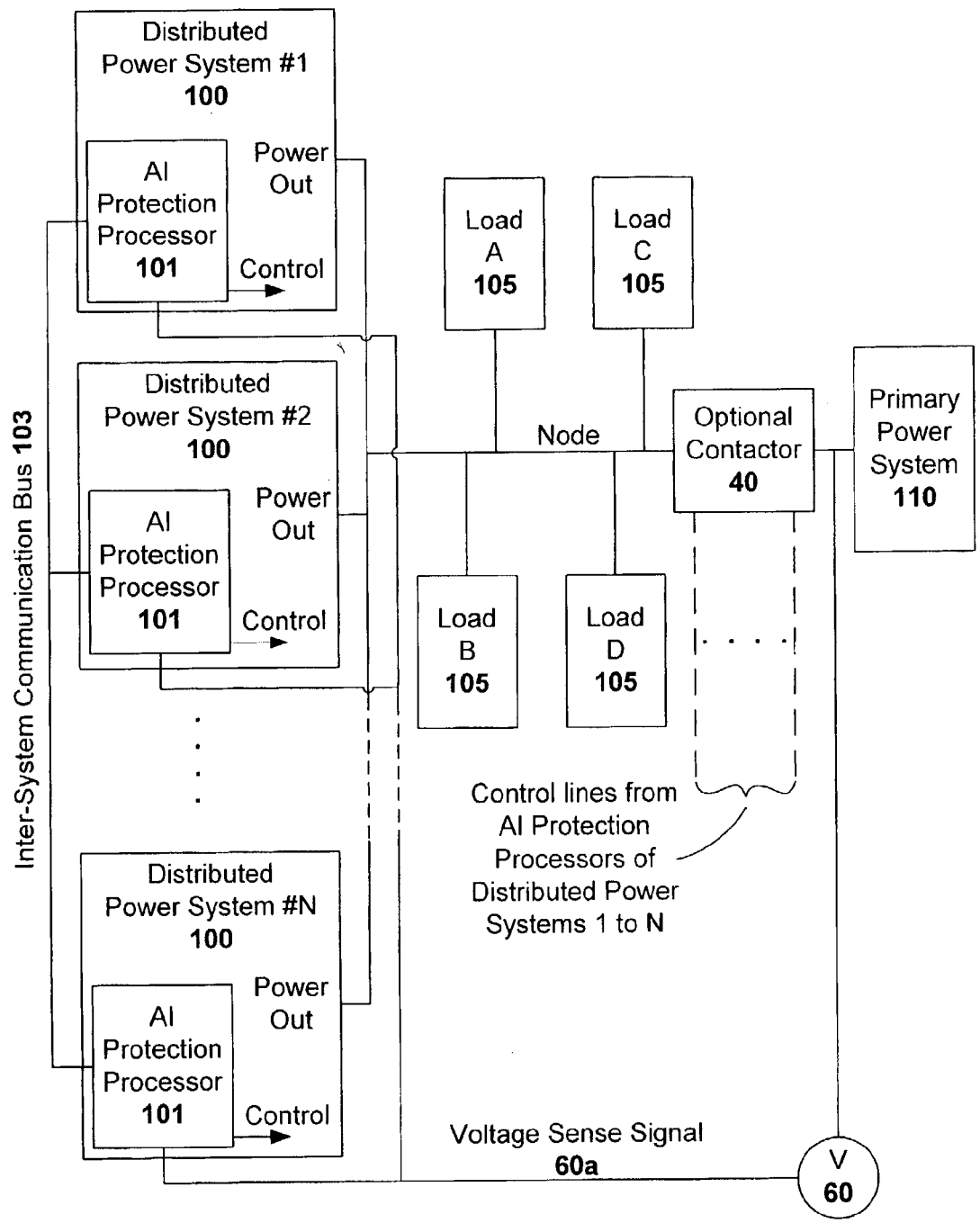
FIG. 1d is a top-level block diagram of a multiple power source system configured in accordance with one embodiment of the present invention.

FIG. 1d is a top-level block diagram of a multiple power source system configured in accordance with one embodiment of the present invention. The system includes a number of distributed power systems 100 that are operatively coupled to a primary power system 110 via a node. An optional contactor 40 may be included as part of the operative coupling, but need not be. A number of loads 105 are connected to the node, and a voltage sensor 60 is adapted to monitor the voltage on the node. The distributed power systems 100 are communicatively coupled with one another via an inter-system communication bus 103.

As can be seen, each distributed power system 100 is capable of providing power to the node, and is capable of current output control. Each system 100 includes an AI protection processor 101. Each AI protection processor 101 may be included, for example, in an inverter controller included in each system 100. In one embodiment, each processor 101 is a set of software instructions that are executable by a microcontroller unit included in the inverter controller. The microcontroller is adapted with memory (e.g., RAM and ROM type memories), a central processor, a number of I/O ports for receiving and outputting data (voltage/current sensing inputs and control signal outputs), and other supporting modules, such as voltage/current sensing modules and data bus ports. Other implementations will be apparent in light of this disclosure.

Each of the AI protection processors 101 is capable of communicating with the other processors 101. Such inter system communication facilitates synchronization and of AI pulse delivery and zero-crossing detection. Note that such inter system communication and synchronization may speed up an island detection process, but neither is necessary for the present invention to operate. The inter-system communication bus 103 may be implemented in conventional serial or parallel data bus technology.

If a shut-down of the primary power system 110 (e.g., a grid) goes undetected, the various loads 105 may continue to receive power from one or more of the distributed power systems 100. Generally stated, the energy stored in one or more of the loads 105 causes the node voltage to appear as if the primary power system 110 is still fully functional and connected.

However, each of the distributed power systems 100 is adapted to detect loss of the primary power system 110, and to disconnect from the node thereby avoiding an island. In particular, each AI protection processor 101 is adapted to effect an AI pulsing scheme as discussed herein, and to monitor for pulse-related disturbances at the node via sensor 60. If the primary power system 110 is down, then the AI pulses provided to the node by the distributed power systems 100 cause disturbances which are sensed at the node by the sensor 60, and island conditions are thereby identified. Once detected, the distributed power systems 100 can shut-down. Alternatively, optional contactor 40 serially connected at the node could be opened in response to one or more control signals (e.g., such as control signal 30a as discussed in reference to FIGS. 1a, 1b, and 1c) from the processors 101 thereby disconnecting the primary power system 110 from the distributed power systems 100.

Note that one or more of the distributed power systems 100 may have a poly-phase output. In such a case, the local AI protection processor 101 can be adapted to provide a distinct islanding detection process as described herein for each phase output by the corresponding system 100. For example, one AI pulse can be provided in the phase B output of a three phase system, and another AI pulse can be provided in the phase C output of the system. Further note, however, that island detection can be performed by any one phase on any one distributed system that is included on the island. Participation of other phases and distributed sources on that island is not necessary. Such multiple participation simply provides a cumulative effect.

System Functionality

In one embodiment, the anti-islanding control scheme operates by applying an AI current pulse to the output of a given distributed source 10 at selected zero voltage crossings, and then monitoring for a voltage deflection of the line voltage using a voltage sensor. If a deflection occurs, the grid 20 is not present and an island condition exists. Although examples herein refer to single phase cases, it will be appreciated to one skilled in the art that the present invention is applicable to poly-phase systems as well. For example, in a 3-phase system, each phase is typically operated independently, and the principles of the present invention can be applied to each phase of the system as described in this disclosure.

Figure 2:
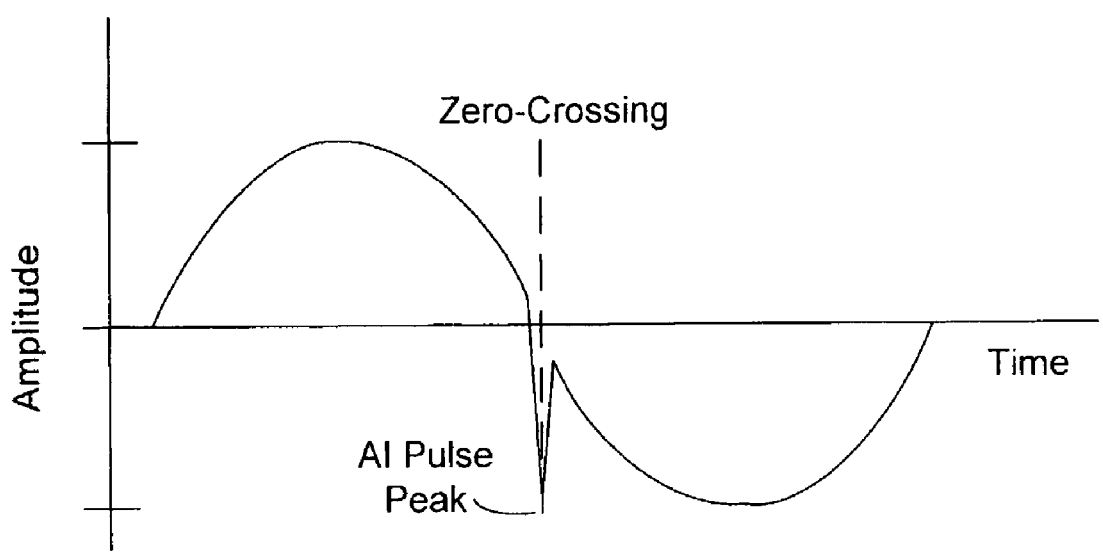
FIG. 2 is a graphical representation of a single phase sinusoidal waveform with an anti-islanding pulse induced voltage deflection in accordance with an embodiment of the present invention.

As shown in FIG. 2, the AI pulse is applied to a single phase sinusoidal waveform output by the system's inverter. Here, the AI pulse is a current spike or signal in a direction opposing the direction of the upcoming half cycle as previously stated. Empirical data indicates that opposing the upcoming cycle provides a more pronounced result. Note, however, that the methodology works in either polarity. Thus, each applied current pulse can either oppose the direction of the upcoming half cycle, or can coincide with the direction of the upcoming half cycle, and island detection is enabled. Likewise, a pulse amplitude of approximately 100% of the rated peak current associated with source 10 will generally provide the desired distortion, but other amplitudes may be used to achieve a similar result.

Generally, the AI pulse will not distort or otherwise affect the voltage waveform of a grid connected system due to the extremely high conductance of the grid 20 (e.g., near infinity). If an island is present, however, the impedance of the island matches the generation capacity of the distributed sources 10 on the island. The island conductance is typically magnitudes lower than the grid conductance, and a voltage deflection will occur when a current is driven into the island impedance. As such, the AI pulse noticeably affects the voltage waveform of the island. Thus, it is possible to distinguish between normal grid conditions and an island condition.

The AI pulse is applied at the voltage zero-crossings because the total real power driven into the impedance at that instant should be zero from all distributed power generation sources 10. By applying real power into the impedance at that point, any deflection of voltage is more easily detectable than at the peak of the sinusoidal waveform. In addition, all energy in reactive components coupled to the line will have dissipated and not oppose or interfere with the AI pulse and its effects on the voltage waveform if a stable island condition exists.

Moreover, by applying the AI pulse at the zero-crossing, the maximum current of the source 10 is available for the peak amplitude of the pulse. Note that if the AI pulse was generated at the peak of the sinusoid, for instance, only the over-current capacity of the source 10 would be available for creating the AI pulse. Further note that for the peak of the AI pulse to occur at the source's 10 zero-crossing, the AI pulse is requested prior to the actual zero-crossing so that the pulse can timely reach its peak at approximately the zero-crossing.

All power sources 10 of a given system can be internally synchronized based upon a particular zero-crossing, and no external sync communication is necessary. This internal synchronization of the system sources is based on the requirement that all sources coupled to a grid have similar parameters (e.g. phase and amplitude) so as to prevent unintended current surges between differing potentials. In this sense, the power sources 10 of the system are synchronized using a zero-crossing associated with the grid. Once a particular source's zero-crossing is identified, all other zero-crossings can be keyed and synchronization is thus achieved.

Figure 3A:
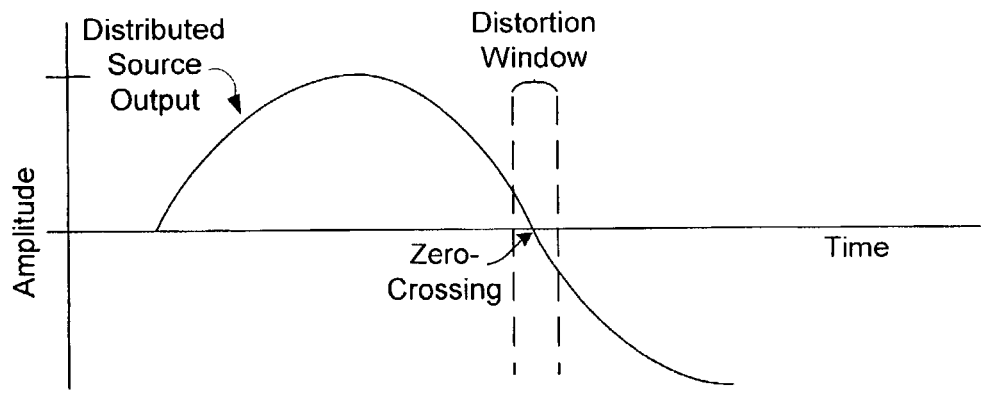
FIGS. 3a and 3b each illustrate a graphical representation of one or more single phase sinusoidal waveforms and respective distortion windows in accordance with embodiments of the present invention.
Figure 3B:
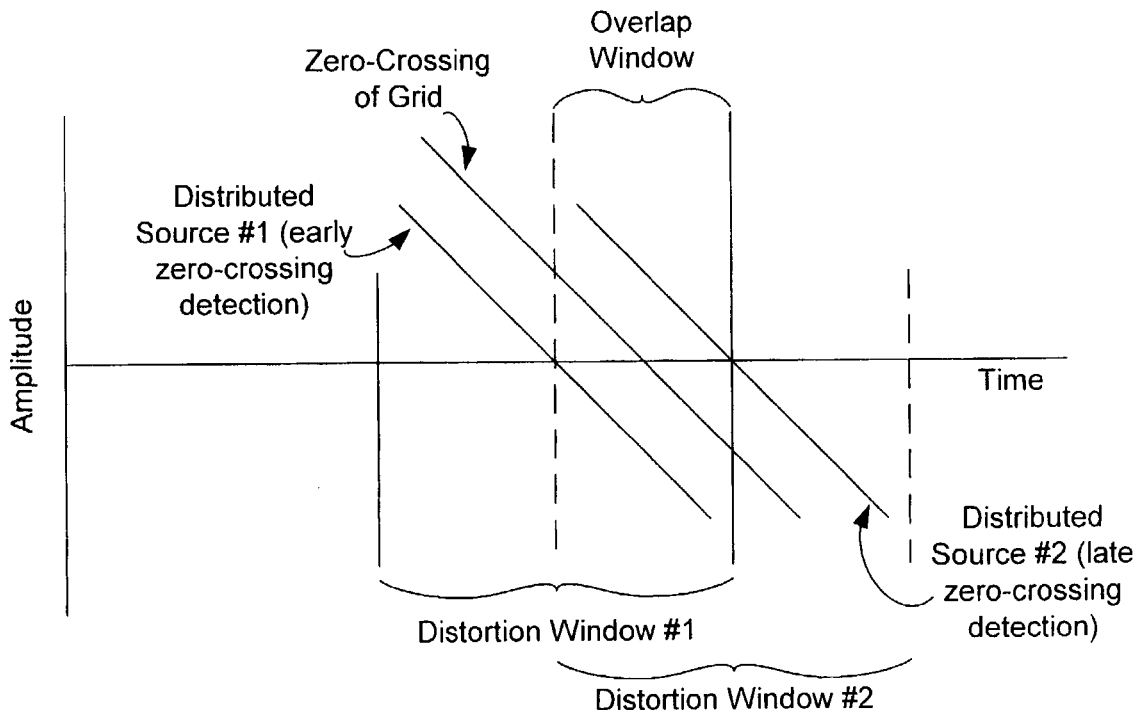

FIGS. 3a and 3b each illustrate a graphical representation of one or more single phase sinusoidal waveforms and respective distortion windows in accordance with embodiments of the present invention. Note that a single phase application is depicted, but multiphase applications may also employ the principles of the present invention as will be apparent.

A distortion window marks the period of time from initial application of the AI pulse (e.g., slightly before the zero-crossing so that the peak of the pulse coincides with the zero-crossing) to a pre-determined subsequent point in time (e.g., at 50% of the AI pulse interval). Using a distortion window allows some margin if there are minor zero-crossing detection errors associated with any of the distributed power generation sources 10 in a given system. In addition, the distortion window provides a range where a plurality of synchronized sources 10 can be monitored within a the window.

FIG. 3b illustrates a first distributed source 10, which has an early zero-crossing detection relative to the zero-crossing associated with the grid, and a second distributed source 10, which has an late zero-crossing detection relative to the zero-crossing associated with the grid. An overlap window within the distortion window identifies zero-crossing detection differences between the distributed sources 10. A correction factor can thus be identified.

Another basis for the AI pulse occurring at the zero-crossing is synchronization of the pulse with other generating sources 10 that are employing the same method of island detection. For one source 10 driving an island, this synchronization is not important. When many sources 10 are driving a large island, however, a single one of those sources may not be able to supply enough current to cause a detectable voltage deflection or other pulse-related disturbance. The synchronization of multiple sources 10 driving at the zero-crossing will have a cumulative effect on the voltage deflection thereby making that voltage deflection more detectable for all connected distributed sources employing this technique of island detection.

Thus, the ability to detect an island independent of the island size is realized for all distributed sources 10 applying a pulse at the same zero-crossing, whether from a single source, all sources, or a sub-set of the sources in the system. The resulting voltage deflection increases proportionally as the number of pulsing sources increases. An island condition exists when the voltage deflection resulting from the AI pulse or pulses climbs greater than the expected grid voltage.

An underlying principle associated with embodiments of the present invention is that a connected grid voltage cannot be disturbed by selectively modifying an output of a distributed power generation services. If the grid is down or otherwise disconnected, then the modified output will manifest on the islanded node being powered by the distributed power generation services.

By applying the AI pulse on every cycle, assurance of mutual island detection with similar enabled systems is realized. However, this may also increase the THD applied to the line to an unacceptable level. To meet the required THD limits (e.g., 5%), the AI-pulse can be applied at a time interval or pattern as previously stated. This time interval can be, for example, keyed, fixed, or randomized based on a preliminary zero-detection so that the resultant average THD measured over continuous grid operation is under the required limits. For systems to synchronize the AI-pulse for large island detection, a technique to line up the pulses for one out of N cycles is needed.

One such technique is to employ a key sequence that lines up over a pre-established number of cycles independent of phase differences. Alternatively, a random time application could be used within the N cycles so as to limit the amount of AI pulses to some sub-set of N. Alternatively, a fixed time interval could be used that causes a phase drift over time thereby allowing the AI pulses to align for one cycle. Note that all sources 10 on an island need not align for the present invention to operate, but the more sources 10 that are aligned during one AI pulse, the more pronounced the manifestation of the pulses will be in an islanding situation.

When an island is detected for one source 10, and that source drops off of the island, the island is no longer balanced and supportable. All the remaining sources 10 will then immediately drop off, because the island voltage or frequency will generally fall out of required limits. Therefore, it only takes one system on the island to realize an island condition exists and disconnect the associated power source 10 to make the remaining systems also drop from the grid 20.

In accordance with one embodiment of the present invention, therefore, anti-islanding protection is achieved by monitoring the line voltage for zero-crossings, applying current pulses, and monitoring the line voltages for island indicating data, such as a voltage deflection. Note that temperature, pressure, humidity, and other parameters do not affect the measurements and operation of this technique.

Implementation

Embodiments of the present invention may be implemented, for example, in software executing on one or more digital signal processors or other suitable processing environment (e.g., microcontroller). For instance, the modules of the anti-islanding protection controller 30 can be integrated into a processor included in the inverter controller 11. Alternatively, the principles of the present invention can be implemented in conventional analog and digital circuitry design techniques (e.g., ASIC). The actual implementation details will depend on factors such as desired system cost and manufacturing overhead.

During normal mode operation of one embodiment, the AI pulse is generated at a pulse repetition frequency (PRF) included in a first range (e.g., 0.6 Hz to 6.0 Hz). Such a AI pulse interval allows the THD output of the distributed source 10 to remain low during normal, or non-islanded conditions. Once an initial island detect threshold has been exceeded, the interval at which AI pulses are requested by the AI pulse Timing/Keying module increases to a higher second range (e.g., 60 Hz to 120 Hz). In response, the AI pulse generator (e.g., programmed or otherwise configured into the inverter controller 11) increases the PRF of the AI pulse for a pre-programmed period (e.g., 100 cycles). A progressive increase in AI pulsing can also be implemented, where a series of island detect threshold are set. Once a threshold is met or otherwise exceeded, the PRF of the AI pulse is increased to the next higher range. This process can repeat until the highest threshold is exceeded and an AI pulse is being delivered every cycle.

In one embodiment, an island detect accumulator (e.g., filter/timing module 31) is implemented which allows filtering and hysteresis of AI detect indications provided from the island detection module 33. This allows island detection thresholds to be set more tightly, as one or two untrue island detect indications will not cause the power source 10 to erroneously shut-down, sometimes referred to as a nuisance trip.

Another embodiment of the present invention provides a scheme that allows for simple communication between the distributed power generation sources 10 are included in a system where numerous parallel sources 10 are connected to a common grid node. A greater sensitivity and rapid island detection is facilitated when parallel distributed sources 10 are made to simultaneously generate AI pulses, thereby causing a greater voltage deflection of the common grid node.

For instance, once an initial island detect indication is set for a particular inverter, the inverter jumps into high PRF AI detect mode. The parallel inverters detect the high PRF of the subsequent AI pulses on the common node, and can then also enter a high PRF AI detect mode for a pre-programmed period. With numerous sources 10 operating in high PRF AI detect mode, the island detect accumulator 31 will rapidly charge to the full-on island detect threshold to confirm an island condition. This applies the full capability of the parallel inverters thereby allowing inverters of different ratings to work in concert, as well as expanding the range of line/load conditions (e.g., impedances) in which island detection can reliably occur.

Impedance Detection

As previously explained, useful information can be extracted from the effects of injecting the AI pulse, including a node voltage deflection. Alternatively, a modulation index can be determined that provides an indirect approximation of the node impedance. When node impedance is high (such as when and island occurs), the detection of that high impedance is indicative of an island detection. The modulation index can be calculated as AI pulse change in di/dt.

The modulation index can be observed and stored in memory. A change in node impedance may be detected by observing a change or a trend in the stored information. Such a detected impedance change is a preliminary indicator of a possible islanding condition, and provides an impetus for increasing the interval at which AI pulses are injected. Note that sensors employed can be adapted to sense any type of node data that characterizes an intentional AI pulse-related disturbance, or a passive disturbance such as shift in impedance.

Thus, this impedance detection method can be used in conjunction with, or instead of, the voltage deflection island detection method. Further, this impedance detection method provides information required by distributed inverters for applications such as parallel voltage source operation, where the inverters benefit from a matched output impedance, current sharing, etc.

Figure 4A:
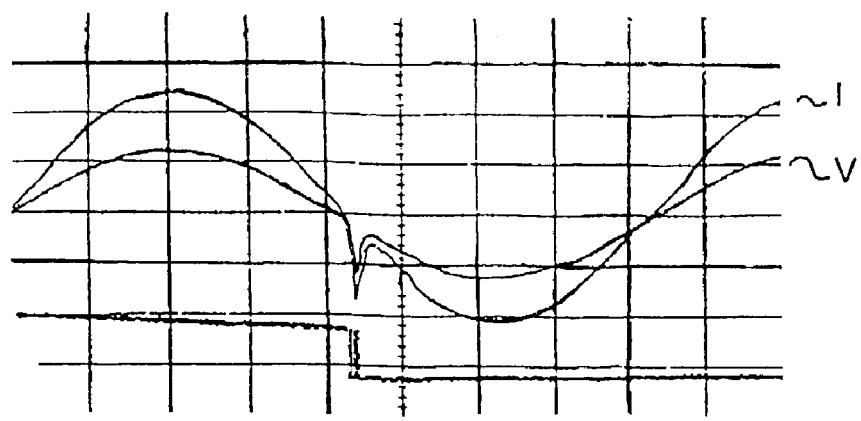
FIGS. 4a and 4b each illustrate a graphical presentation of an anti-islanding pulse being fed to a resistive load and resultant voltage deflections.
Figure 4B:
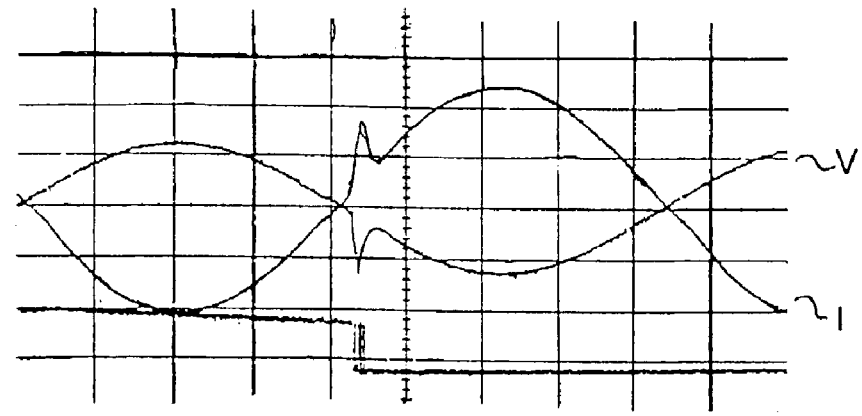

FIGS. 4a and 4b each illustrate a graphical presentation of an AI pulse being fed to a resistive load and resultant voltage deflections. The pulse on phase B of a poly-phase system is shown in FIG. 4a, while the pulse on phase C of the system is illustrated in FIG. 4b. In both cases, the trace marked with I indicates the current waveform output by the inverter 11, while the trace marked V indicates the grid voltage waveform. The bottom trace indicates the AI pulse request going active.

Figure 4C:
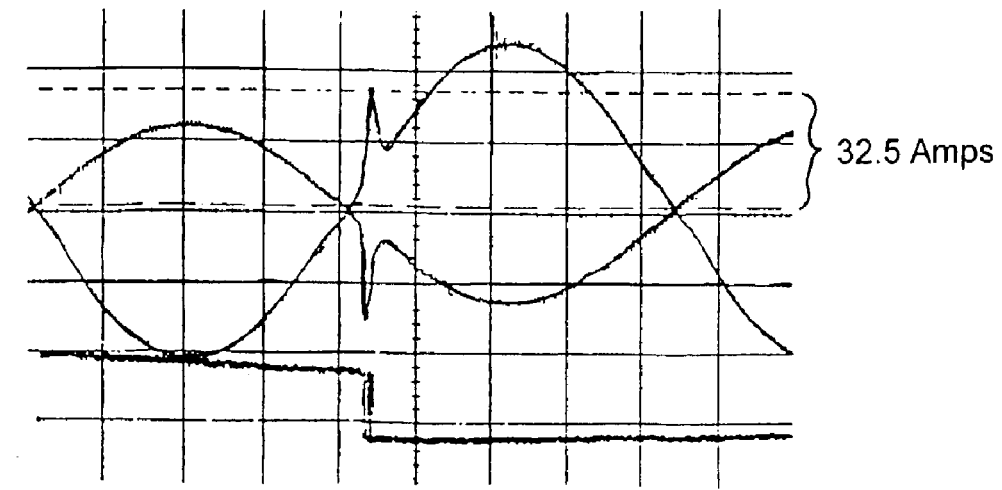
FIG. 4c is a graphical presentation of an anti-islanding pulse being fed to a resistive load and the pulse amplitude.
Figure 4D:
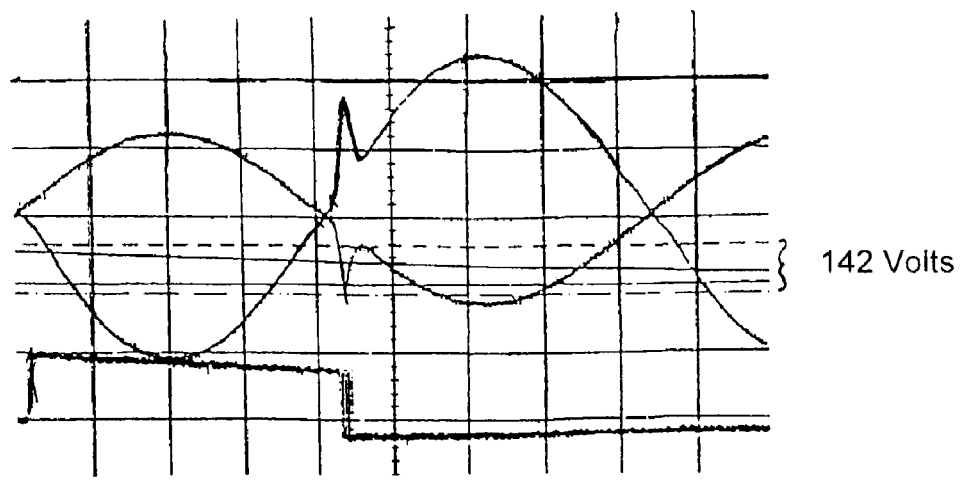
FIG. 4d is a graphical presentation of an anti-islanding pulse being fed to a resistive load with the resultant voltage disturbance.
Figure 5:
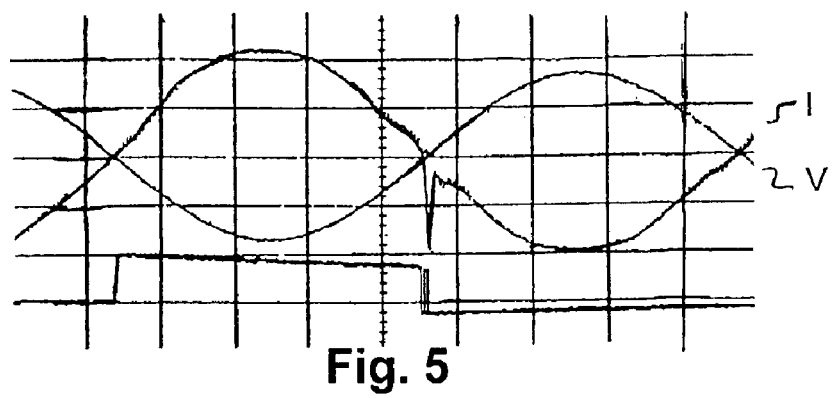
FIG. 5 is a graphical presentation demonstrating that the grid voltage is undisturbed by an anti-islanding pulse.

FIG. 4c measures the phase C AI pulse amplitude to be about 32.5 amps. FIG. 4d shows the resultant voltage deflection or disturbance to be about 142 volts. Note that based on the magnitude of the deflection indicated on the grid voltage waveform, the grid is disconnected and an island is present. In contrast, FIG. 5 is a graphical presentation showing the grid voltage undisturbed by the AI pulse, indicating that the grid is present. A transformer was used during testing to simulate a soft grid.

Figure 6:
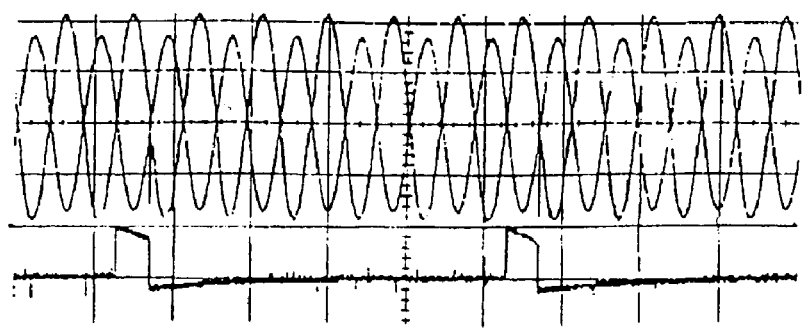
FIG. 6 is illustrates a graphical presentation of the period of applied anti-islanding pulses at 6 cycles.

A graphical presentation demonstrating a periodic application of AI pulses at every 6 cycles is shown in FIG. 6. Again, the current waveform output by the inverter 11 and the corresponding grid voltage waveform are shown. Note the downward AI pulse in the current waveform at the falling edge of the AI pulse request. The periodic timing of the AI pulses is adjustable and can be set accordingly as discussed herein, with the desired result being the timely detection of an island (e.g., within two seconds of island inception). Providing the AI pulses every 6 cycles (AI pulse period of 100 mS) allows typical agency THD standards (e.g., under 5%) to be satisfied.

When one AI pulse detects an island, the time between application of the AI pulses is reduced as previously stated. In one embodiment, every additional island detection will further reduce the inter-pulse time until one AI pulse is injected every cycle. This technique causes additional harmonic distortion only when the system thinks there is an island condition, and the inter-pulse time is reduced to confirm the presence of an island. If, however, the grid connection is confirmed, the inter-pulse time is moved back to its periodic interval (e.g., one injection every 6 cycles) thereby maintaining the grid connected THD below 5%, or at any other THD limit as set by an approving agency or standards body.

The duty cycle of the inverter increases with respect to the requested current as opposed to the measured current based upon the integration constants. Thus, a requested step change in current quickly saturates the integrator (output filter 14) over a 6 degree window.

Three measurements were made to compare the effects of applying an AI pulse having a duration of 6 degrees at the zero-crossings. The first measurement was taken without the AI pulse, and was used as a reference to determine the harmonic distortions effects of the pulse. The second set of measurements was taken while injecting AI pulses on the positive-to-negative zero-crossings only. The third set of measurements was taken while injecting AI pulses on both the negative-to-positive and the positive-to-negative zero-crossings. In none of test cases performed did the THD exceed the IEEE limit of 5% where a periodic AI pulse was injected in accordance with the principles of the present invention.

The foregoing description of the embodiments of the invention has been presented for the purposes of illustration and description. It is not intended to be exhaustive or to limit the invention to the precise form disclosed. Many modifications and variations are possible in light of this disclosure. For example, the present invention is not intended to be limited to grid applications, but can be applied to any application where there are multiple sources contributing power to a system. All of the sources in the system may be local to one another, or some may be local while others are remote. It is intended that the scope of the invention be limited not by this detailed description, but rather by the claims appended hereto.

What is claimed is:

1. An anti-islanding system for distributed power on a grid, comprising:
   a distributed power source operatively coupled to a grid and adapted with output current control, the distributed power source for providing power;
   a voltage sensor connected to a node between the distributed power source and the grid, and adapted to monitor grid voltage;
   a contactor operatively coupled between the distributed power source and the voltage sensor, and adapted for disconnecting the grid from the distributed power source; and
   an anti-islanding protection controller operatively coupled to the distributed power source and the voltage sensor, the anti-islanding protection controller adapted to request the distributed power source to selectively output a current pulse in the power being provided so as to cause a voltage deflection in the grid voltage if an island condition exists, and to detect an island condition based on voltage deflection data provided by the voltage sensor wherein the current pulse is requested by the anti-islanding protection controller according to a pre-defined routine depending on the voltage deflection data provided by the voltage sensor.

2. The system of claim 1 wherein the distributed power source includes:
   an inverter adapted to receive an input signal and provide output power from that signal in accordance with a pulse width modulation scheme; and
   an inverter controller operatively coupled to the inverter, the inverter controller adapted to receive current pulse requests from the anti-islanding protection controller, and to sense and control the current output of the inverter.

3. The system of claim 2 wherein the inverter controller is further adapted to receive an island detect signal from the anti-islanding protection controller and to shut-down the inverter if an island is detected.

4. The system of claim 2 wherein the inverter controller is further adapted to receive grid voltage measurements from the voltage sensor.

5. The system of claim 1 further including:
   a second voltage sensor operatively coupled to a node between the distributed power source and the contactor, and adapted for monitoring local power.

6. The system of claim 1 wherein the distributed power source is adapted to be disabled in response to receiving an island detect signal from the anti-islanding protection controller.

7. The system of claim 1 wherein the system includes a plurality of distributed power sources connected in parallel.

8. The system of claim 1 wherein the distributed power source is a poly-phase source.

9. The system of claim 1 wherein distributed power source is adapted to provide an AC output, and current pulses requested by the anti-islanding protection controller are each applied at a zero-crossing of the AC output.

10. The system of claim 1 wherein distributed power source is adapted to provide an AC output that includes a number of half cycles including a current half cycle and an upcoming half cycle, with each half cycle associated with a direction, and each applied current pulse either opposes the direction of the upcoming half cycle, or coincides with the direction of the upcoming half cycle.

11. The system of claim 1 wherein the anti-islanding protection controller is further adapted to detect one or more zero-crossings of an AC signal output by the distributed power source, and to provide a distortion window about the zero-crossing, the distortion window allowing for a margin of error in zero-crossing detection.

12. The system of claim 1 wherein the distributed power source and other operatively coupled distributed power sources are synchronized using a zero-crossing associated with the grid.

13. The system of claim 1 wherein the anti-islanding protection controller is configured so that current pulses are applied at least one of periodically, randomly, or according to a pattern so as to maintain total harmonic distortion within agency standards.

14. The system of claim 1 wherein the anti-islanding protection controller is further adapted to request a current pulse at a pulse repetition frequency included in a first range when the system is operating in a normal mode, and a pulse repetition frequency included in a higher second range in response to an initial island detect threshold being exceeded.

15. The system of claim 1 wherein the anti-islanding protection controller is further adapted to change an interval at which the current pulse is applied based on quantity of island detections received in a given time period.

16. The system of claim 1 wherein the anti-islanding protection controller includes an island detect accumulator thereby enabling filtering and hysteresis of island detect indications.

17. The system of claim 1 wherein the system includes a plurality of distributed power sources connected in parallel, and a number of the sources are communicatively coupled with one another.

18. The system of claim 1 wherein the anti-islanding protection controller is further adapted to detect changes in line impedance based on data provided by the voltage sensor.

19. A method for detecting an island in a system including a node that is operatively coupled to a voltage sensor, a grid and one or more distributed power generation sources, the method comprising:
   selectively applying a current pulse from at least one of the distributed power generation sources onto the node wherein selectively applying the current pulse includes requesting the current pulse according to a pre-defined routine depending on the voltage deflection data measured at the node;
   monitoring the node with the voltage sensor for a disturbance related to the applied current pulse wherein in response to detecting the disturbance, at least one of disabling the at least one distributed power generation source and disconnecting the at least one distributed power generation source from the grid; and
   in response to detecting a disturbance, signaling an island detection.

20. The method of claim 2 further including at least one of enabling the at least one distributed power generation source and re-connecting the at least one distributed power generation source to the grid in response to detecting grid voltage is re-established.

21. The method of claim 20 wherein the at least one distributed power generation source is adapted to provide an AC output, and selectively applying the current pulse includes:
   detecting zero-crossings associated with the AC output; and
   applying the current pulse at one or more zero-crossings of the AC output.

22. The method of claim 20 wherein the at least one distributed power generation source is adapted to provide an AC output that includes a number of half cycles including a current half cycle and an upcoming half cycle, with each half cycle associated with a direction, and selectively applying the current pulse includes applying the current pulse in a direction that either opposes the direction of the upcoming half cycle, or coincides with the direction of the upcoming half cycle.

23. The method of claim 20 further comprising:
   synchronizing the one or more distributed power generation sources using a zero-crossing associated with the grid.

24. The method of claim 20 wherein selectively applying the current pulse includes applying current pulses at least one of periodically, randomly, or according to a pattern so as to maintain total harmonic distortion within agency standards.

25. The method of claim 20 wherein selectively applying the current pulse includes applying the current pulse at a pulse repetition frequency included in a first range when operating in a normal mode, and a pulse repetition frequency included in a higher second range in response to an initial island detect threshold being exceeded.

26. The method of claim 20 wherein selectively applying the current pulse includes changing an interval at which the current pulse is applied based on quantity of island detections in a given time period.

27. The method of claim 20 further including performing filtering and hysteresis of signaled island detections so as to reduce nuisance trips.

28. The method of claim 20 wherein monitoring the node with the voltage sensor for a disturbance related to the applied current pulse includes:
   measuring a voltage on the node with the voltage sensor at a time corresponding to application of the current pulse;
   comparing the measured voltage to an expected voltage thereby generating a difference signal; and
   in response to the difference signal exceeding a limit window, indicating the disturbance.

29. The method of claim 20 wherein monitoring the node with the voltage sensor for a disturbance related to the applied current pulse includes monitoring changes in line impedance based on data measured on the node.

30. An apparatus for detecting an island in a system including a node that is operatively coupled to a grid and one or more distributed power generation sources, the apparatus comprising:
   a pulse request module adapted to generate a pulse request that causes a distributed power generation source to include a current pulse in its output signal so that a pulse-related disturbance will manifest on the node if an island is present;
   an island detection module adapted to generate an island detect signal in response to a pulse-related disturbance being detected on the node; and
   an island detect accumulator adapted to receive island detect signals from the island detection module, and to perform filtering and hysteresis of received island detect signals so as to reduce nuisance trips.

31. The apparatus of claim 30 wherein apparatus is included in an inverter controller associated with one of the distributed power generation sources.

32. The apparatus of claim 30 further including:
   a zero-crossing detection module adapted to detect zero-crossings of the output signal and provide zero-crossing information to the pulse request module so that the current pulse can be applied at the zero-crossing.

33. The apparatus of claim 30 wherein the system includes a sensor adapted to sense node data that characterizes the pulse-related disturbance, the apparatus further including:
   a comparator module adapted to compare a sensed node data to expected node data so as to generate a difference signal; and
   a limit window module adapted to receive the difference signal and to generate an island indication signal if the difference signal exceeds a limit associated with the limit window module.

34. The apparatus of claim 33 wherein the island detection module has a first input that receives the island indication signal from the limit window and a second input that receives a sync signal from the pulse request module that indicates when the current pulse is active, and an island detect signal is generated by the island detection module when both of its inputs are true.

35. The apparatus of claim 30 wherein the system includes a sensor adapted to sense node data, the apparatus further including:
 a phase lock loop module that is adapted to receive node data, and to compute expected node data based on the received node data.

36. The apparatus of claim 30 wherein the pulse request module is configured so that current pulse are requested at least one of periodically, randomly, or according to a pattern so as to maintain total harmonic distortion within agency standards.

37. The apparatus of claim 30 wherein the pulse request module is configured to request current pulses according to a pre-defined routine depending on voltage deflection data provided by a voltage sensor that is operatively coupled to the node.

38. The apparatus of claim 30 wherein the pulse request module is configured to request a current pulse at a pulse repetition frequency included in a first range when operating in a normal mode, and a pulse repetition frequency included in a higher second range in response to an initial island detect threshold being exceeded.

39. The apparatus of claim 30 further including:
 an island detect accumulator adapted to receive island detect signals from the island detection module, and to provide a threshold signal to the pulse request module, wherein the pulse request module is further configured to change an interval at which the current pulse is applied based on the threshold signal.

40. The apparatus of claim 30 wherein the pulse-related disturbance is a voltage deflection.

41. An apparatus for detecting an island in a system including a node that is operatively coupled to a primary power source and one or more distributed power generation sources, the apparatus comprising:
 a disturbance request module adapted to cause a distributed power generation source to modify its output so that a disturbance-related to the modified output will manifest on the node if an island is present;
 an island detection module adapted to generate an island detect signal in response to a disturbance-related to the modified output being detected on the node; and
 an island detect accumulator adapted to receive island detect signals from the island detection module, and to perform filtering and hysteresis of received island detect signals so as to reduce nuisance trips.

* * * * *